Patented Oct. 18, 1949

2,485,529

UNITED STATES PATENT OFFICE 2,485,529

COMPOSITION FOR REMOVING SCALE FROM FERROUS METAL SURFACES

Paul H. Cardwell, Tulsa, Okla., and Grover E. Mullin, Philadelphia, Pa., assignors to The Dow Chemical Company, Midland, Mich., a corporation of Delaware No Drawing. Application August 14, 1948, Serial No. 44,413

12 Claims. (Cl. 252—149)

The invention relates to compositions for removing scale deposits from ferrous metal surfaces. It more particularly concerns an improved composition comprising hydrochloric acid for use in removing scale deposits from iron or steel surfaces.

One of the well known uses of hydrochloric acid is the removal of scale deposits, such as those comprising the various iron oxides or other foreign matter soluble in the acid, by pickling the scaled surface with the acid. In as much as the acid also attacks and dissolves the metal underlying the deposits to be removed, a corrosion inhibitor is added which reduces the rate of attack of the acid upon the metal while the scale is being removed. In this connection, urea and some of its derivatives generally have some effect in reducing the rate of attack upon the metal by the acid when present therein in comparatively small concentrations. However, when the deposits to be removed contain a ferric iron constituent, as when the scale contains ferric oxide, for example, the acid solution generally becomes additionally corrosive in spite of the presence of the aforementioned agents.

The added corrosion is occasioned by the fact that the ferric iron constituent of the scale is invariably reduced to ferrous iron on being dissolved by the acid, the reduction occurring at the expense of the underlying metal according to the stoichiometrical relation:

$$Fe + 2Fe^{+++} = 3Fe^{++}$$

This equation shows that for each 111.68 pounds of ferric iron constituent dissolved from the scale by the acid solution, 55.84 pounds of solid metal underlying the scale also dissolve.

The principal object of the invention is to provide a hydrochloric acid solution suitable for dissolving from ferrous metal surfaces scale containing a ferric iron constituent, with reduced attack upon the underlying metal. Other objects and advantages will appear as the description of the invention proceeds.

The invention is predicated upon the discovery that by including in the acid solution a soluble thiocyanate together with urea or derivative thereof, such as thiourea, diethylthiourea, diisopropylthiourea, dibutylthiourea, ethylenethiourea, sym.-di-o-tolylthiourea, sym.-di-p-tolylthiourea, sym.-diphenylthiourea, scale containing a ferric iron constituent may be removed from a ferrous metal surface with greatly reduced attack upon the underlying metal, as compared to that obtained when the acid solution is used with either the soluble thiocyanate or the urea and its derivatives alone. The invention then consists in the scale-removing composition hereinafter more fully described and particularly pointed out in the claims.

In carrying out the invention, aqueous hydrochloric acid is used in a concentration suitable for decomposing, dissolving, or disintegrating the scale deposits to be removed from the ferrous metal surfaces, such as those of iron and steel. Complete solution of the scale is not always necessary. Some scale deposits contain both acid-soluble and insoluble constituents and usually slough off when attacked by the acid without completely dissolving. A concentration between about 5 and 25 per cent is usually suitable, although other concentrations can be used. A preferred concentration is about 10 per cent of hydrochloric acid by weight. Some of the higher concentrations are more difficult to inhibit against acid corrosion; hence, the lowest HCl concentration that will effectively remove the scale is preferably used. To the acid solution is added a relatively small amount of urea or one of the aforementioned urea derivatives. Effective concentrations are between about 0.002 and 1 per cent. Generally, useful concentrations are from about 0.05 per cent to 0.1 per cent by weight.

In order to suppress the added corrosiveness acquired by the acid solution as it dissolves ferric iron from the scale and tends to form ferric ions subject to reduction by metallic iron, we add to the acid solution, in accordance with the invention, in addition to the urea or urea derivative acid corrosion inhibitor, a water-soluble inorganic thiocyanate. Suitable soluble thiocyanates are the alkali metal thiocyanates and ammonium thiocyanate. The amount of the thiocyanate to use is preferably that calculated to be somewhat in excess of that stoichiometrically equivalent to the ferric iron to be dissolved by the acid in descaling the ferrous metal surface. To calculate the amount of ferric iron to be dissolved in a given scale removal operation, one may resort to a conventional analysis of the scale giving the percentage of the ferric iron therein. From such an analysis and a knowledge of the area of the ferrous metal surface covered by the scale to be removed, an estimate of the total weight of ferric iron-forming material of the scale is computed on the assumption that during the acid treatment of the scale all the ferric iron-forming constituents therein will be dissolved by the acid solution. The stoichiometrically equivalent weight, or preferably 10 to 50 per cent in excess thereof, of soluble thiocyanate is then ascertained from the weight of ferric ironforming material in accordance with the weight ratio of about 58 grams of thiocyanate (SCN) to 56 grams of ferric iron ($Fe^{+++}$).

For example, we have found that when the amount of ferric iron in the scale is sufficient to form a 1 per cent solution of iron in the descaling acid solution, approximately 1.0 per cent of ammonium thiocyanate or sodium or potassium thiocyanate is sufficient to be effective in reducing the attack upon the ferrous metal surfaces by the ferric iron. When there is less ferric iron in the scale, a smaller amount of thiocyanate may be used. Similarly, when larger amounts of ferric iron are present, larger amounts of thiocyanate are used. In general, the amount to use will lie between about 0.1 and 2.0 per cent of the weight of the solution.

Similarly, data as to the amount of acid-soluble material in the scale may be used to ascertain the quantity of acid needed. The amount of acid used is preferably substantially in excess of actual needs. In some instances, in order to reach all the scale, as when treating the inside of a vessel having a large volume, a larger volume of acid solution may be required in filling the equipment than is actually needed for the amount of scale involved. This is usually the case in treating steam boilers.

The following data are illustrative of the effect of dissolved ferric iron in inhibited hydrochloric acid on its corrosiveness to ferrous metal. In obtaining these data, test pieces of mild steel 1 inch by 2 inches by ⅛ inch were submerged in 300 milliliters of 10 per cent hydrochloric acid solution at 150° F. for 16 hours, during which the solution was continuously slowly agitated, and the loss in weight of the test pieces due to attack by the acid solution was measured. From a number of such tests it was found that the average rate of weight loss was 0.683 pound per square foot per day in the hydrochloric acid alone. When similar test pieces were subjected to similar tests in the acid solution containing 1 per cent of ferric iron as ferric chloride, the rate of attack as measured by weight loss was increased to 1.179 pounds per square foot per day. Thus, the presence of ferric iron in the acid solution increased its corrosiveness more than 72 per cent. Upon adding to the acid solution containing dissolved ferric iron both urea or one of the aforementioned urea derivatives and an alkali metal or ammonium thiocyanate in accordance with the invention, the corrosiveness of the solution is greatly reduced, the reduction in corrosiveness being greater than that obtainable with either of the foregoing types of agents alone. This is demonstrated in the following table of data which shows the increased reductions in corrosion occasioned by the combined use of the two types of agents. The data also illustrate the effect of varying the concentration of the agents. In obtaining the data, the same test procedure was used as that already mentioned in connection with determining the corrosiveness of hydrochloric acid with and without added ferric chloride.

TABLE I

*Effect of combined use of a soluble thiocyanate and either urea or a urea derivative on the corrosion rate of mild steel held in 10 per cent HCl containing 1 per cent of $FeCl_3$ at 150° F. for 16 hours*

| Compound Name | Per Cent Used | Thiocyanate, Per Cent NH₄ | Na | K | Corrosion Rate, lbs. per sq. ft. per day |
|---|---|---|---|---|---|
|  |  | 0.5 |  |  | 1.179 |
|  |  | 0.75 |  |  | 0.576 |
|  |  | 1.00 |  |  | 0.564 |
|  |  | 2.00 |  |  | 0.558 |
|  |  |  |  |  | 0.443 |
|  |  |  | 1.0 |  | 0.543 |
|  |  |  |  | 1.0 | 0.549 |
| Urea | 0.05 |  |  |  | 1.189 |
|  | 0.05 | 0.5 |  |  | 0.131 |
|  | 0.05 | 0.75 |  |  | 0.098 |
|  | 0.05 | 1.00 |  |  | 0.084 |
|  | 0.05 | 2.00 |  |  | 0.073 |
|  | 0.05 |  | 1.0 |  | 0.088 |
|  | 0.05 |  |  | 1.0 | 0.081 |
| Thiourea | 0.05 |  |  |  | 1.005 |
|  | 0.05 | 0.5 |  |  | 0.195 |
|  | 0.05 | 0.75 |  |  | 0.183 |
|  | 0.05 | 1.00 |  |  | 0.142 |
|  | 0.05 | 2.00 |  |  | 0.173 |
|  | 0.05 |  | 1.0 |  | 0.130 |
|  | 0.05 |  |  | 1.0 | 0.135 |
| Diethylthiourea | 0.05 |  |  |  | 0.281 |
|  | 0.05 | 0.50 |  |  | 0.157 |
|  | 0.05 | 0.75 |  |  | 0.144 |
|  | 0.05 | 1.00 |  |  | 0.138 |
|  | 0.05 | 2.00 |  |  | 0.192 |
|  | 0.05 |  | 1.0 |  | 0.140 |
|  | 0.05 |  |  | 1.0 | 0.148 |
| Diisopropylthiourea | 0.05 |  |  |  | 0.335 |
|  | 0.05 | 0.5 |  |  | 0.098 |
|  | 0.05 | 0.75 |  |  | 0.077 |
|  | 0.05 | 1.00 |  |  | 0.073 |
|  | 0.05 | 2.00 |  |  | 0.080 |
|  | 0.05 |  | 1.0 |  | 0.092 |
|  | 0.05 |  |  | 1.0 | 0.094 |
| Dibutylthiourea | 0.05 |  |  |  | 0.275 |
|  | 0.05 | 0.5 |  |  | 0.098 |
|  | 0.05 | 0.75 |  |  | 0.093 |
|  | 0.05 | 1.00 |  |  | 0.085 |
|  | 0.05 | 2.00 |  |  | 0.139 |
|  | 0.05 |  | 1.0 |  | 0.070 |
|  | 0.05 |  |  | 1.0 | 0.080 |
| Ethylenethiourea | 0.05 |  |  |  | 0.309 |
|  | 0.05 | 0.50 |  |  | 0.146 |
|  | 0.05 | 0.75 |  |  | 0.118 |
|  | 0.05 | 1.0 |  |  | 0.096 |
|  | 0.05 | 2.0 |  |  | 0.137 |
|  | 0.05 |  | 1.0 |  | 0.079 |
|  | 0.05 |  |  | 1.0 | 0.086 |
| Sym.-di-o-tolylthiourea | 0.005 |  |  |  | 1.123 |
|  | 0.005 | 0.50 |  |  | 0.101 |
|  | 0.005 | 0.75 |  |  | 0.090 |
|  | 0.005 | 1.00 |  |  | 0.077 |
|  | 0.005 | 2.00 |  |  | 0.081 |
|  | 0.005 |  | 1.00 |  | 0.078 |
|  | 0.005 |  |  | 1.00 | 0.088 |
| Sym.-di-p-tolylthiourea | 0.005 |  |  |  | 1.112 |
|  | 0.005 | 0.50 |  |  | 0.113 |
|  | 0.005 | 0.75 |  |  | 0.100 |
|  | 0.005 | 1.00 |  |  | 0.079 |
|  | 0.005 | 2.00 |  |  | 0.064 |
|  | 0.005 |  | 1.00 |  | 0.074 |
|  | 0.005 |  |  | 1.00 | 0.086 |
| Sym.-diphenylthiourea | 0.005 |  |  |  | 0.134 |
|  | 0.005 | 0.50 |  |  | 0.084 |
|  | 0.005 | 1.00 |  |  | 0.051 |
|  | 0.005 | 2.00 |  |  | 0.059 |
|  | 0.005 |  | 1.00 |  | 0.062 |
|  | 0.005 |  |  | 1.00 | 0.069 |

The table gives in the first column the name of the urea compound employed; the second column, its amount in per cent by weight; the third, fourth, and fifth columns give the amount of thiocyanate, if any, in per cent by weight, added to the acid solution; and the sixth, the rate of corrosion of the test pieces by the acid solution, expressed in pounds per square foot of surface exposed to the acid solution per day. It will be observed in the first entry of the table that 10 per cent aqueous hydrochloric acid solution containing 1 per cent of ferric chloride corrodes mild steel at the rate of 1.179 pounds per square foot per day, and in the next three lines this rate may be decreased by the addition of various amounts, viz. 0.5, 0.75, 1.00, and 2 per cent by weight, of ammonium thiocyanate to the acid solution to 0.576, 0.564, 0.558, and 0.443 pound per square foot per day respectively. The next two lines show that 1 per cent of sodium thiocyanate or 1 per cent of potassium thiocyanate reduces the rate of corrosion to 0.543 and 0.549 pound per square foot per day respectively. The effect of urea and urea derivatives in the acid and in combination with either ammonium, sodium, or potassium thiocyanate is shown in the subsequent entries. For example, referring to the entries concerning urea, when the urea in the amount of 0.05 per cent is present in the acid containing the ferric chloride, the rate of corrosion is changed from 1.179 pounds per square foot per day to 1.189 pounds per square foot per day. When either 0.5 per cent, 0.75 per cent, 1.0 per cent or 2 per cent of ammonium thiocyanate or 1.0 per cent of sodium thiocyanate, or 1.0 per cent of potassium thiocyanate is also present, the corrosion rate is decreased to 0.131, 0.098, 0.084, 0.073, 0.088, and 0.081 pound per square foot per day respectively. The remaining entries concerning the effect of the urea derivatives alone and combined with a thiocyanate may be compared in similar manner by reference to the table. In each instance the combined use of the urea or urea derivative and the soluble thiocyanate produces a greater reduction in corrosiveness than that obtainable from either of the agents used alone in the acid solution.

In addition to the greatly reduced corrosiveness of the acid resulting from the combined use of the two agents compared to the use of either one alone, additional gains are had in the case of diisopropylthiourea. This agent, in combination with the soluble thiocyanate, has the property of rendering a hydrochloric acid solution containing ferric ions even less corrosive than hydrochloric acid without ferric ions.

This is shown in the following tabulation:

TABLE II

Corrosion rate of mild steel held in 10 per cent HCl containing a thiocyanate and 0.05 per cent of diisopropylthiourea at 150° F. for 16 hours, with and without added FeCl₃

| Thiocyanate Added, Per Cent | | | Corrosion Rate, lbs.per sq. ft.per day | |
|---|---|---|---|---|
| NH₄ | Na | K | No FeCl₃ | 1K FeCl₃ |
| 0.50 | | | 0.101 | 0.098 |
| 0.75 | | | 0.112 | 0.077 |
| 1.00 | | | 0.127 | 0.073 |
| 2.00 | | | 0.166 | 0.080 |
| | 1.00 | | 0.120 | 0.092 |
| | | 1.00 | 0.119 | 0.094 |

Thus, in the presence of diisopropylthiourea and soluble thiocyanate the ferric iron appears to reduce rather than increase the rate of corrosion of steel in the acid solution.

In using our improved descaling composition, it may be brought into contact with the surface to be descaled in any suitable manner, as by immersing the article bearing the scale in the composition or otherwise inundating the scaled surface. Scaled insides of vessels are readily descaled by filling the vessels with the composition, which is allowed to remain in contact with the scale until dissolved, loosened, or sloughed off. Descaling usually is accomplished in a few minutes to several hours, depending upon the nature and composition of the scale. It is preferable to use the composition at elevated temperature, such as from about 100° F. to 160° F., although other temperatures may be used. The lowest temperatures at which reasonably rapid descaling is had are used preferably. After the action of the descaling solution is completed the surface may be drained and rinsed with water. It is desirable to use as a final rinse a dilute alkaline solution such as a 1 per cent aqueous solution of sodium carbonate.

The composition has the advantage of effectively attacking and removing scale deposits from ferrous metal surfaces with greatly reduced attack upon the underlying metal when the deposits contain a ferric ion-forming constituent.

This application is a continuation-in-part of our application Serial No. 608,612, filed August 2, 1945, now abandoned.

We claim:

1. A composition for descaling a ferrous metal surface comprising an aqueous solution containing by weight from about 5 to 25 per cent of HCl, from about 0.002 to 1 per cent of a corrosion-modifying agent selected from the group consisting of urea, thiourea, diethylthiourea, diisopropylthiourea, dibutylthiourea, ethylenethiourea, sym.-thiourea, di-o-tolylthiourea, sym.-di-p-tolylthiourea, and sym.-diphenylthiourea, and from 0.1 to 2.0 per cent of a water-soluble inorganic thiocyanate.

2. A composition according to claim 1 in which the water-soluble thiocyanate is ammonium thiocyanate.

3. A composition according to claim 1 in which the water-soluble thiocyanate is sodium thiocyanate.

4. A composition according to claim 1 in which the water-soluble thiocyanate is potassium thiocyanate.

5. A composition for descaling a ferrous metal surface comprising an aqueous solution containing by weight from about 5 to 25 per cent of HCl, from about 0.002 to 1 per cent of urea, and from about 0.1 to 2 per cent of a water-soluble inorganic thiocyanate.

6. A composition according to claim 5 in which the water-soluble inorganic thiocyanate is ammonium thiocyanate.

7. A composition according to claim 5 in which the water-soluble inorganic thiocyanate is sodium thiocyanate.

8. A composition according to claim 5 in which the water-soluble inorganic thiocyanate is potassium thiocyanate.

9. A composition for descaling a ferrous metal surface comprising an aqueous solution containing by weight from about 5 to 25 per cent of HCl, from about 0.002 to 1 per cent of diisopropylthiourea, and from about 0.1 to 2 per cent of a water-soluble inorganic thiocyanate.

10. A composition for descaling a ferrous metal surface comprising an aqueous solution containing by weight from about 5 to 25 per cent of HCl, from about 0.002 to 1 per cent of sym.-di-o-tolyl-thiourea, and from about 0.1 to 2 per cent of a water-soluble inorganic thiocyanate.

11. A composition for descaling a ferrous metal surface comprising an aqueous solution containing by weight from about 5 to 25 per cent of HCl, from about 0.002 to 1 per cent of sym.-diphenyl-thiourea, and from about 0.1 to 2 per cent of a water-soluble inorganic thiocyanate.

12. A composition for descaling a ferrous metal surface comprising an aqueous solution containing by weight from about 5 to 25 per cent of HCl, from about 0.002 to 1 per cent of sym.-diphenyl-thiourea, and from about 0.1 to 2 per cent of ammonium thiocyanate.

PAUL H. CARDWELL.
GROVER E. MULLIN.

No references cited.